US 6,603,483 B1

United States Patent
Newman

(10) Patent No.: US 6,603,483 B1
(45) Date of Patent: Aug. 5, 2003

(54) COLOR MANAGEMENT AND PROOFING ARCHITECTURE

(75) Inventor: Todd D. Newman, Palo Alto, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/440,463

(22) Filed: Nov. 15, 1999

(51) Int. Cl.$^7$ .............................................. G09G 5/02
(52) U.S. Cl. ...................... 345/593; 345/594
(58) Field of Search .................. 345/589, 501, 345/600, 604, 601, 602, 603, 605, 606–610, 612, 611, 590, 591–599, 964; 382/162, 163, 164, 165, 166, 167; 358/2.1–3.03, 3.23–3.27, 515–527; 430/143

(56) References Cited

U.S. PATENT DOCUMENTS

| | | | | |
|---|---|---|---|---|
| 5,208,911 A | * | 5/1993 | Newman et al. | 345/600 |
| 5,254,978 A | | 10/1993 | Beretta | 345/150 |
| 5,311,212 A | | 5/1994 | Beretta | 345/150 |
| 5,416,890 A | | 5/1995 | Beretta | 395/131 |
| 5,432,906 A | * | 7/1995 | Newman et al. | 345/501 |
| H1506 H | | 12/1995 | Beretta | 345/199 |
| 5,646,752 A | * | 7/1997 | Kohler et al. | 358/520 |
| 5,731,818 A | | 3/1998 | Wan et al. | 345/431 |
| 5,832,109 A | | 11/1998 | Mahy | 382/162 |

OTHER PUBLICATIONS

Mooney, Mary A., "Managing Color in Interactive Systems", Tutorials, ACM ISBN 1–58113–028–7, CHI 98•18–23, pp. 169–170, Apr. 1998.

Agfa Photography, Trends and Experience, "Color Management", http://www.agfaphoto.com/magazin/9607/colormanagement_article.html, Agfa–Gevaert AG, 1996 (visited Oct. 21, 1999).

Agfa News/Events, "Agfa's FotoTune Color Management Software ships with new Hewlett–Packard DesignJet 755CM InkjetPrinter", http://www.agfahome.com/features/seybold/agfahp.html, Agfa Corporation, 1995–1999 (visited Oct. 21, 1999).

"File Format for Color Profiles", Specification ICC.1:1998–09, International Color Consortium®, 1998.

Ján Morovič, "To Develop a Universal Gamut Mapping Algorithm", Thesis Submitted to the University of Derby, Oct. 1998, Condensed format edition.

L. W. MacDonald, "Gamut Mapping in Perceptual Colour Space", IS&T/SID's Color Imaging Conference: Transforms & Transportability of Color, 1993, pp. 193–196.

* cited by examiner

Primary Examiner—Matthew Luu
Assistant Examiner—Thu Thao Havan
(74) Attorney, Agent, or Firm—Fitzpatrick, Cella, Harper & Scinto

(57) ABSTRACT

The generation of a color transformation sequence comprised of transform steps, wherein the color transformation sequence is for transforming color image data. At least one reference to a color profile or a gamut mapping algorithm is received, and at least one transform step is generated based on the at least one reference, wherein the at least one transform step is a profile step or a gamut-mapping step. The at least one transform step is included in the color transformation sequence.

23 Claims, 11 Drawing Sheets

COLOR MANAGEMENT AND PROOFING ARCHITECTURE

BACKGROUND OF THE INVENTION

1. Field of the Invention

The invention concerns a color management system whereby an efficient sequence of transform steps is generated for transforming color image data through one or more color spaces. The sequence of transform steps is generated based upon pre-selected color profiles and gamut mapping algorithms. In this manner, complex transform sequences for performing color management of color image data, such as proofing, creative color modeling, and gamut boundary determinations, can be quickly created, applied and evaluated by a developer.

2. Description of the Related Art

Traditionally, proofing is performed in the graphics art industry to simulate the output of a printing press without having to invest the time and cost of actually printing a sample for review. Proofing is commonly done with a proofing machine that uses the same input medium as that used by the printing press, such as film or digital color image data, in order to create a simulation of the printed image. More recently, proofing systems have been developed which allow a graphic artist to simulate a printed image by rendering digital color image data on a CRT display. Proofing systems which utilize digital color image data attempt to provide an accurate rendering of a color image as it would appear on a printing press, or other output device.

Traditional digital color management systems attempt to account for limitations in the range of colors that can be produced by a given output device, such as a printing press, on a given medium, such as coated paper. The color management system therefore attempts to adjust the color data of the input image to account for those colors that are outside the color gamut boundary of the output device. This adjustment is known as gamut mapping, and is performed by application of a gamut mapping algorithm to the color image data. There are several different types of gamut mapping algorithms in use by various color management systems. In addition to gamut mapping, color management systems also attempt to obtain an accurate mapping between a combination of certain device colorants and the appearance that the combination will make on a particular medium by a particular output device under particular viewing conditions. The transformation of color image data from one colorant space to another colorant space is known as appearance modeling. Digital color management systems therefore attempt to achieve accurate gamut mapping and accurate appearance modeling in an efficient manner. This can be difficult in unique situations such as proofing where it is desirable to simulate how color image data from an input device will appear on a given output device by viewing the simulated appearance on a different output device.

The original International Color Consortium (ICC) architecture provides a color management system in which device profiles of an input device and an output device are utilized in order to transform color image data from the input device for rendering on the output device. In this scheme, the device profile of a given device contains several data object tags, some of which comprise multi-dimensional look-up table (LUT) tags. These LUTs are used in the original ICC architecture for appearance modeling to map color image data from a device-dependent color space, such as RGB, into a device-independent color space. On the other hand, the LUTs may be used to map from a device-independent color space to a device-dependent color space. One drawback of this architecture is that it requires mapping to and from the device-independent color space for every transformation between two color profiles.

In the current ICC architecture, device profiles combine appearance modeling and gamut mapping together into LUTs that are contained in the color profiles. The LUTs perform these functions simultaneously by mapping color image data in a color space corresponding to a given combination of output device and viewing conditions into a fictitious color space known as the Profile Connection Space (PCS). The PCS is a standardized color space based upon a fictitious output device, recording medium and set of viewing conditions. Thus, in the current ICC architecture, the application of a LUT to color image data performs both appearance modeling and gamut boundary mapping in one step. A color profile may contain several different sets of LUTs, each of which represents a specific combination of gamut mapping algorithm and viewing condition. The color profile format contains an "intent" flag which indicates to the color management system the particular type of gamut mapping algorithm to apply, upon which the color management system selects the appropriate LUT that corresponds to the particular type of gamut mapping algorithm.

The current ICC architecture supports alternate methods that can be utilized for proofing in order to simulate the appearance of color image data from an input device as it would appear on a given output device by viewing the simulated appearance on another output device. Under the current ICC scheme, special preview tags are provided in the color profile for accessing special preview LUTs which are used to simulate a proof image as it would appear on a given output device. The preview LUTs achieve this simulation by mapping the color image data to a different gamut boundary by using a particular gamut mapping algorithm. The Preview LUTs perform this gamut mapping function by transforming the color image data between device-dependent color space and the fictitious PCS color space.

Like the original ICC scheme, the current ICC scheme for proofing has several drawbacks. First, the preview LUTs of the current ICC scheme require transformation from the PCS color space for every device color profile that is in the color transformation scenario. Every such mapping may introduce some errors due to interpolation errors, round-off errors, and the like. In addition, a preview LUT which is used for simulated proofing does not contain the same data as the LUT which is used to transform the color image data for actual rendering on the output device. Therefore, preview LUTs must be maintained in a coordinated fashion with the actual transformation LUTs for each combination of gamut mapping algorithm and viewing conditions in order to avoid inaccuracies in appearance between the simulated output of color image data in a proofing context and the actual output of the color image data by the output device. Such coordinated maintenance of predetermined LUTs is logistically cumbersome.

An alternative method for proofing under the current ICC architecture is to perform separate consecutive transformations of the color image data by using the actual transformation LUTs for the simulated output device instead of the preview LUTs. For example, the color image data is first transformed from the color space of the input device to the PCS color space, then from the PCS color space to the color space of the simulated output device, then from the color space of the simulated output device to the PCS color space, and lastly from the PCS color space to the color space of the actual output device. Although this alternative method avoids appearance inconsistencies that might be introduced through the use of preview LUTs, the alternative method requires the unnecessary computational overhead associated with repeatedly mapping between device-dependent color spaces and the fictitious PCS color space.

Another ICC architecture has been proposed in the ICC Reference Implementation Working Group (RIWG) which separates the function of appearance modeling from the function of gamut mapping by introducing a new pair of LUT tags in the device color profile format which contain special LUTs for performing appearance modeling only. Special tags called gamut boundary descriptors are also provided in the color profile for containing descriptions of the device's color gamut boundary. The gamut boundary descriptors are used by gamut mapping algorithms when performing gamut mapping on color image data. The ICC RIWG transformation pipeline for transforming color data from the color space of one device to the color space of another color device generally consists of: (1) forward appearance modeling which maps color image data from input device color space to the CIE-JCh color space; (2) application of abstract profiles, if desired, to perform arbitrary color mapping within CIE-JCh space; (3) gamut mapping by applying a gamut mapping algorithm which utilizes the gamut boundary descriptors from input and output color profiles; and (4) reverse appearance modeling which is performed by mapping the color image data from CIE-JCh space to the output device color space.

The ICC RIWG architecture also has drawbacks because gamut mapping between abstract profiles in CIE-JCh space can introduce artifacts into the image data. In addition, this method is cumbersome for proofing because it requires the application of multiple transformation pipelines in order to simulate the appearance of color image data on a given output device by rendering the simulated appearance on another output device. This requires additional transformations between device-dependent color spaces and CIE-JCh space which costs processing overhead. Moreover, this method cannot support a transformation which involves only one color profile. This is problematic for certain unique color management scenarios. For instance, when developing the gamut boundary descriptor for a particular device, it is useful to use a transform where only the color appearance transformation from the color profile that corresponds to the particular device is applied to a test set of color image data to map it from the color space of the particular device to CIE-JCh color space. In this manner, the gamut boundary of the particular device can be determined more efficiently.

A prior art system for providing a color image processing system is disclosed in Newman, et. al., U.S. Pat. No. 5,432,906, entitled "Color Image Processing System For Preparing A Composite Image Transformation Module For Performing A Plurality Of Selected Image Transforms." A system is disclosed in Newman for accepting a series of color transformation requests from a user wherein the transformation requests represent a specific color management scenario that the user wishes to apply to color image data. The system arranges color transformations accordingly and also selects predetermined look-up tables (LUTs) for performing gamut mapping. The system then generates one composite transform which incorporates the arrangement of color transformations and gamut mapping LUTs. The composite transform can then be applied to color image data.

Although the system disclosed in Newman has the ability to support color management scenarios which include multiple transforms, such as proofing, the system is not seen to allow the user to select the particular type of gamut mapping algorithm to be applied to the color image data. The system is seen only to allow the user to select a gamut mapping algorithm which is predetermined and which cannot take into account the gamut boundary descriptions of the relevant devices at the time that the gamut mapping algorithm is applied to the color image data. Furthermore, the creation of a single composite transform is seen to have the potential to introduce errors because portions of non-linear activity in many of the individual color transforms and gamut mapping LUTs may be lost during creation of the composite transform. Lastly, the system disclosed in Newman is not seen to support the unique situation where only one color transform is to be applied to the color image data.

Thus, an improved architecture for color management is needed for providing increased processing efficiency and greater flexibility for use in the color management of color image data. Such a color management architecture is needed for supporting unique situations such as proofing and gamut boundary determinations. A color management architecture is needed which accepts input information from a user regarding a color management scenario and which then efficiently creates an appropriate sequence of accurate color transformations for application to color image data. It is desirable for such a color management architecture to allow the user to select the type of gamut mapping algorithm to be applied, and to allow the use of a gamut mapping algorithm which utilizes gamut boundary descriptions that are not accessed by the gamut mapping algorithm until the gamut mapping is performed.

SUMMARY OF THE INVENTION

The invention addresses the foregoing problems by providing an improved architecture for efficiently creating a transform sequence for use in the color management of color image data. The invention enables a user to create an efficient transform sequence by selecting one or more color profiles and gamut mapping algorithms wherein the selections represent a desired color management process. The created transform sequence is then applied to color image data in order to achieve the desired color management. The improved color management architecture has the capability to support unique situations in color management, such as proofing and color gamut boundary determinations.

Specifically, a first embodiment of the present invention is directed to a method for generating a color transformation sequence comprised of transform steps, wherein the color transformation sequence is for transforming color image data. The method includes receiving at least one reference to a color profile or a gamut mapping algorithm. At least one transform step is generated based on the at least one reference, wherein the at least one transform step is a profile step or a gamut mapping step. The at least one transform step is included in the color transformation sequence.

Preferably, multiple references to color profiles and gamut mapping algorithms are provided by a user. The method preferably generates multiple transform steps based on the multiple references to color profiles and gamut mapping algorithms provided by the user. In addition, the method preferably avoids generating profile steps that would transform the color image data into, and out of, unnecessary device-dependent color spaces.

By virtue of the foregoing arrangement, a color management system is provided whereby an efficient color transformation sequence is generated for transformation of color data. In this manner, a user can create an efficient and accurate color transform sequence and can select the type of gamut mapping algorithms for inclusion in the color transformation sequence.

In another aspect of the invention, a method for transforming color data is provided whereby a color transformation sequence comprised of transform steps is applied to the color image data. The method includes accessing the color transformation sequence and accessing the color image data. Each transform step is sequentially processed to transform the color image data wherein, in the case that the transform step being processed is a profile step, a color transformation module is accessed from a corresponding color profile and is applied to the color image data. In the case that the transform step being processed is a gamut mapping step, a corresponding gamut mapping algorithm is accessed and applied to the color image data.

By virtue of the foregoing arrangement, a color management system is provided whereby an efficient color transformation sequence is applied to color image data. Preferably, the gamut mapping steps of the color transformation sequence correspond to different types of gamut mapping algorithms which utilize color gamut boundary descriptions of the relevant devices when the gamut mapping algorithm is applied to the color image data. In addition, the color transformation sequence preferably contains only those profile steps necessary to achieve the desired color transformation of the color image data, while avoiding unnecessary transformations into, and out of, device-dependent color spaces. In this manner, a user can efficiently apply a desired color management scheme to color image data for evaluation and correction, if necessary.

The embodiments of the invention described above, and other embodiments, may also be provided in other forms, such as a computing device, computer-executable process steps, and a computer-readable medium for storing computer-executable process steps.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

The present invention is generally directed to a color transform module that provides a user with the capability to generate a color transformation sequence for transforming color image data, wherein the color transformation sequence is comprised of transform steps. The user controls the content of the color transformation sequence by selecting one or more input references to color profiles and/or gamut mapping algorithms. The present invention can be implemented in color management systems which are used to transform color image data. For example, the present invention may be incorporated in an output device driver, such as a printer driver, which is contained in a computing device, or embedded in the firmware of an output device, such as a printer, or provided in a color management application for use on a general purpose computer. It can be appreciated that the present invention is not limited to these embodiments and that it may also be implemented in other forms.

Figure 1:
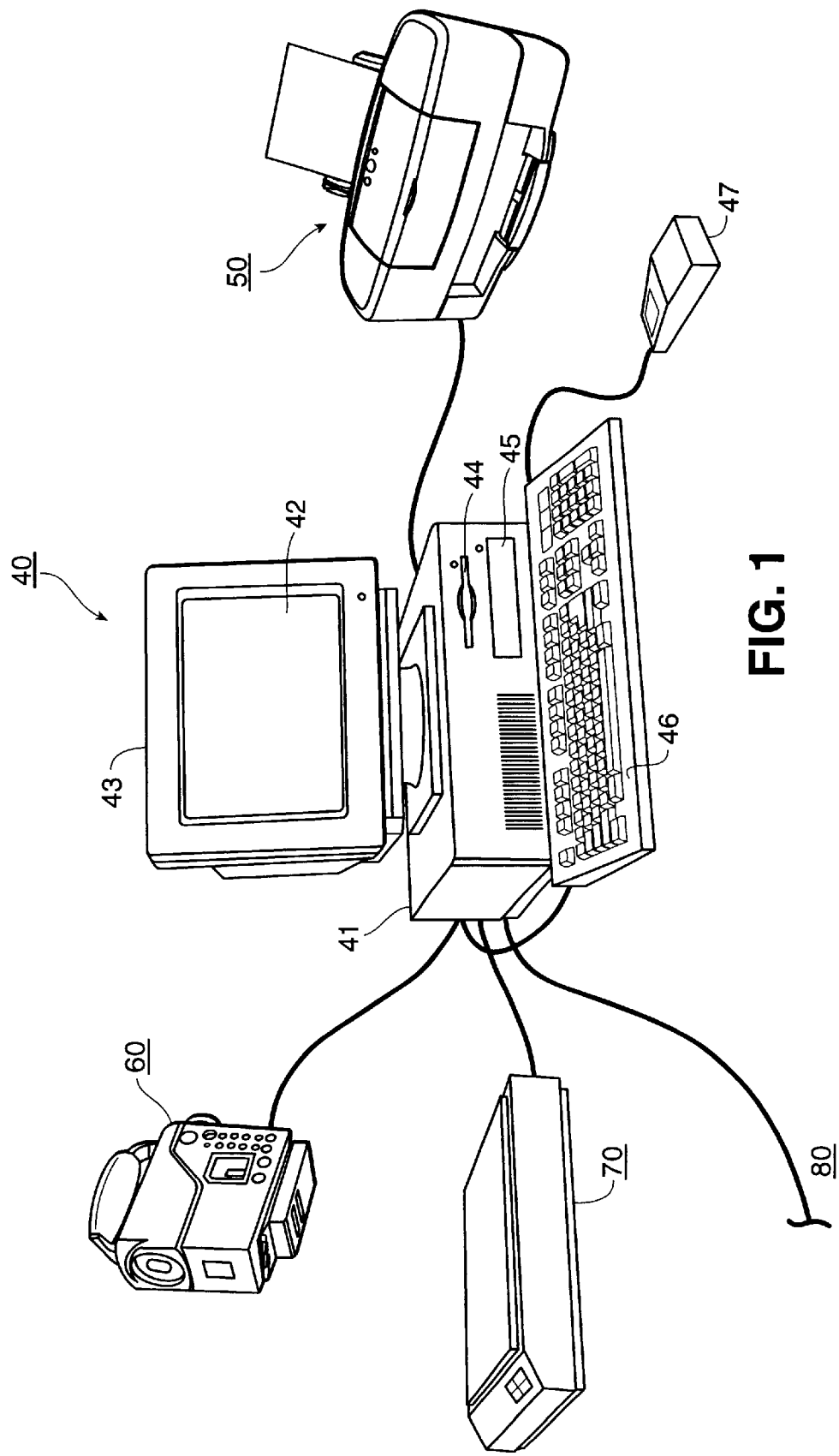
FIG. 1 is a representative view of a computer system in which the present invention may be implemented.

FIG. 1 is a view showing the outward appearance of a representative computing system including computing equipment, peripherals and digital devices which may be used in connection with the practice of the present invention. Computing equipment 40 includes host processor 41 which comprises a personal computer (hereinafter "PC"), preferably an IBM PC-compatible computer having a windowing environment such as Microsoft Windows 95, Windows 98 or Windows NT, although it may be a Macintosh or a non-windows-based computer. Provided with computing equipment 40 are color monitor 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer fixed disk 45 and/or floppy disk drive 44. Floppy disk drive 44 provides a means whereby computing equipment 40 can access information, such as image data, computer-executable process steps, application programs, etc. stored on removable memory media. A similar CD-ROM interface (not shown) may be provided for computing equipment 40 through which computing equipment 40 can access information stored on removable CD-ROM media.

Printer 50 is a printer, preferably a color bubble jet printer, which forms color images on a recording medium such as paper or transparencies or the like. The invention is usable with other printers, however, so long as the printer is capable of being interfaced to computing equipment 40. In addition, digital color scanner 70 is provided for scanning documents and images into computing equipment 40 and digital color camera 60 is provided for sending digital images to computing equipment 40. Of course, computing equipment 40 may acquire digital image data from other sources such as a digital video camera or from a local area network or the Internet via network interface bus 80.

Figure 2:
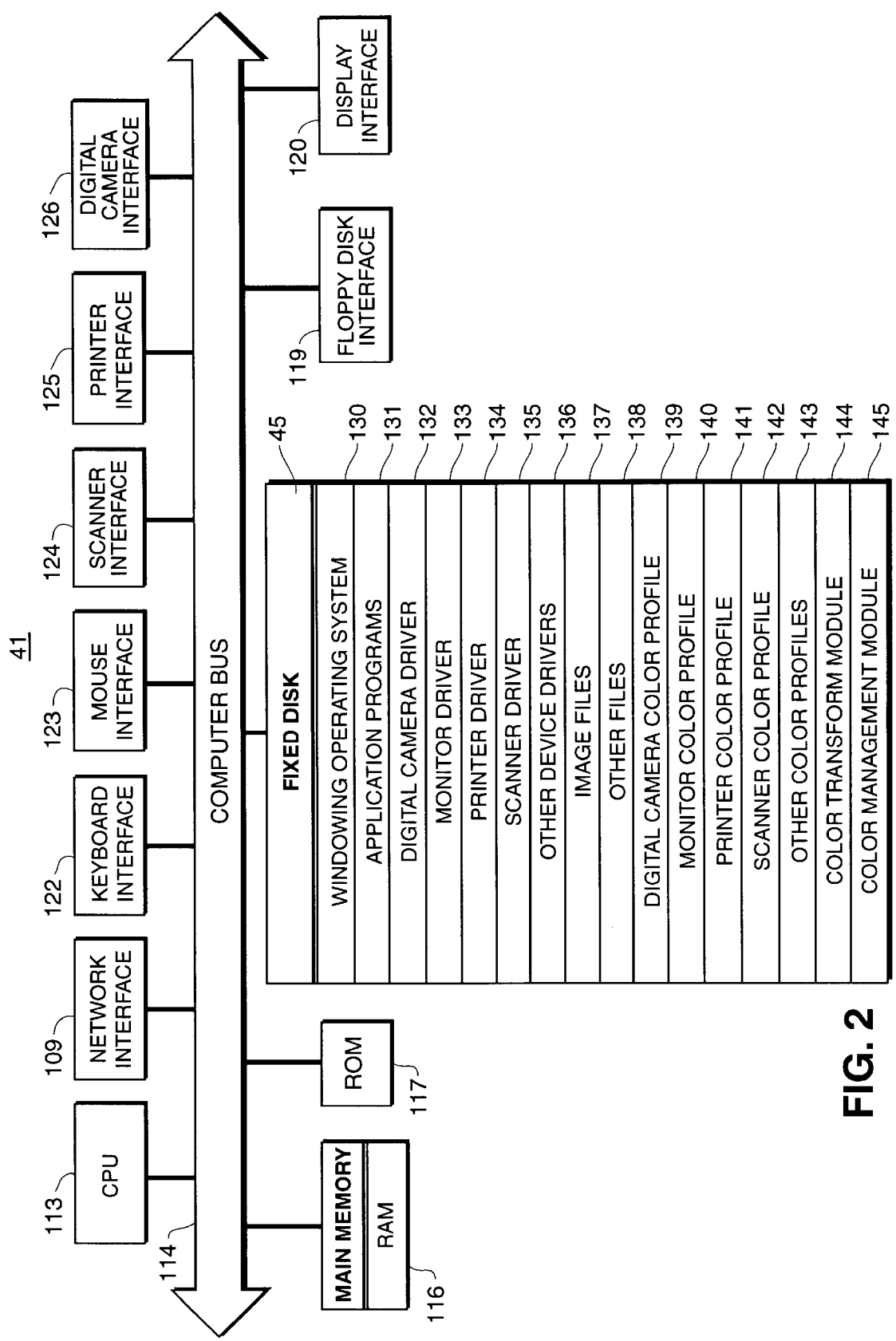
FIG. 2 is a detailed block diagram showing the internal architecture of the computer equipment shown in the computer system of FIG. 1.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as main memory, read only memory (ROM) 117, floppy disk interface 119, display interface 120 to monitor 43, keyboard interface 122 to keyboard 46, mouse interface 123 to pointing device 47, scanner interface 124 to scanner 70, printer interface 125 to printer 50, and digital camera interface 126 to digital camera 60.

Main memory 116 interfaces with computer bus 114 so as to provide RAM storage to CPU 113 during execution of software programs such as an operating system, application programs and device drivers. More specifically, CPU 113 loads computer-executable process steps from fixed disk 45, another storage device, or some other source such as a network, into a region of main memory 116. CPU 113 then executes the stored process steps from main memory 116 in order to execute software programs such as an operating system, application programs and device drivers. Data such as color images can be stored in main memory 116, where the data can be accessed by CPU 113 during the execution of computer-executable process steps which use or alter the data.

As also shown in FIG. 2, fixed disk 45 contains operating system 130, which is preferably a windowing operating system although other operating systems may be used, application programs 131, such as image processing applications that include a color management module, and plural device drivers, including a digital camera driver 132, monitor driver 133, printer driver 134, scanner driver 135, and other device drivers 136. Fixed disk 45 also includes image files 137, other files 138, digital camera color profile 139 for digital camera 60, monitor color profile 140 for monitor 43, printer color profile 141 for printer 50, scanner color profile 142 for scanner 70, and other color profiles 143 for other devices and peripherals (not shown). Also provided on fixed disk 45 are color transform module 144 which implements the present invention and color management module 145 which provides conventional color management functions. The functions of color transform module 144 are preferably provided in the form of computer-executable process steps. As mentioned above, the functions of color transform module 144 may be alternatively integrated into an output device driver, such as printer driver 134, or into an application program for performing processing of color image data, such as one of application programs 131.

Figure 3:
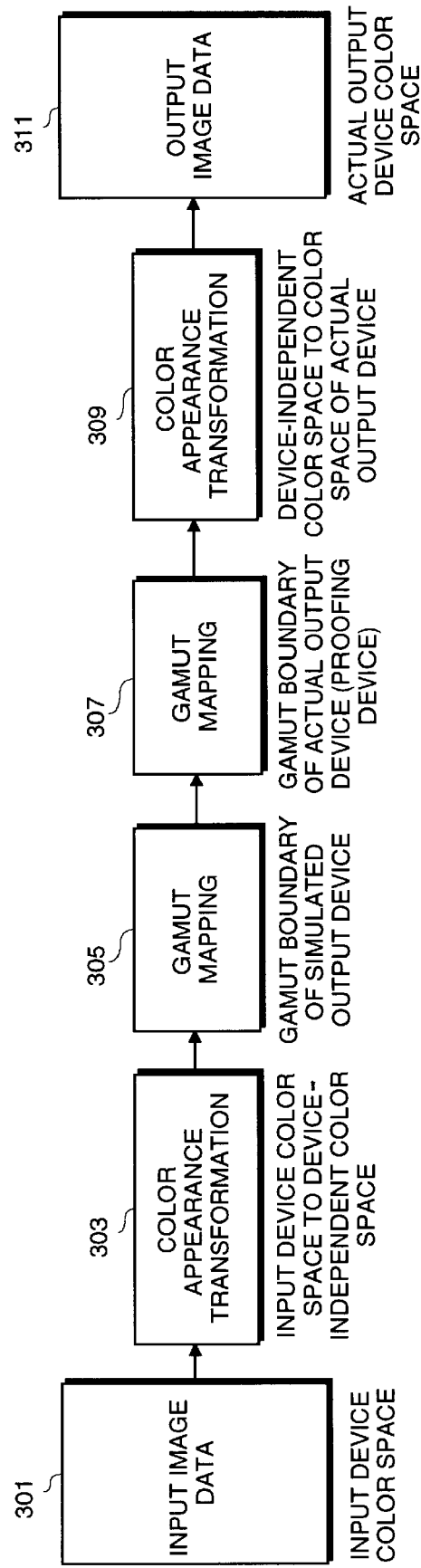
FIG. 3 is a view for providing an explanation of an example of the transformation of color image data according to the invention.

FIG. 3 provides an explanation of an example of a transformation of color image data according to the present invention. Specifically, the present invention provides the capability of creating an efficient color transformation sequence for transforming color image data through the use of multiple color transformations. The present invention therefore is useful in complex color transformation scenarios, such as proofing of color image data. As discussed above, the proofing of a color image involves simulating the appearance of a color image as it would appear on a particular output device by transforming the color image data appropriately and outputting it on another output device for viewing. Such a scenario is depicted in FIG. 3.

Turning to FIG. 3, a block diagram depicts an example of a color transformation sequence according to the present invention for transforming color image data for simulating the appearance of the color image data as it would appear on an output device and outputting the simulated image on another output device for viewing. Input image 301 contains color image data which is defined in an input device color space. For instance, input image 301 may have been obtained from a scanner, in which case input image 301 contains color image data in RGB (red, green, blue) color space. Of course, input image 301 may have been obtained from other sources such as digital camera 60 or from a remote memory location accessible via network interface bus 80, wherein the remote memory storage may reside on a local area network or on the Internet. Color appearance transformation 303 is then applied to input image 301 to transform the color image data from input device color space to a device-independent color space, such as JCh color space. The device-independent color space is not associated with any particular device or set or viewing conditions and is therefore a convenient color space in which to perform transformations on the color image data, such as color appearance transformations and gamut mapping transformations.

Next, gamut mapping 305 gamut-maps the color image data into the gamut boundary of the simulated output device, thereby transforming the color image data into the gamut boundary of the output device for which a proof image is being simulated. For example, gamut mapping 305 could perform gamut mapping to map the color image data to fit within the gamut boundary that corresponds to a printing press. In this manner, the color image data corresponding to input image 301 can be output on another output device, such as a monitor, for providing a proof image which simulates the appearance of input image 301 as it would appear if actually output on the printing press. Another gamut mapping 307 is performed on the color image data to map the color image data to fit within the gamut boundary of the actual output device on which the proof image will actually be rendered. For example, the proof image, which simulates the appearance of input image 301 as it would appear on a printing press, is mapped within the gamut boundary of a monitor so that those portions of the color image data that are outside the gamut boundary of the monitor can be reasonably depicted by the monitor. Lastly, color appearance transformation 309 is applied to the color image data to transform the color image data from the device-independent color space to the color space of the actual output device.

For example, if the output device actually used for rendering the proof image is a monitor, then color appearance transformation 309 transforms the color image data from device-independent color space to the color space of the monitor which is RGB. Thus, the output of the transformation sequence depicted in FIG. 3 is output image 311 which is a proof image for simulating the appearance of an image as it would have been rendered by one output device even though the proof image is actually rendered on another output device.

Figure 4A:
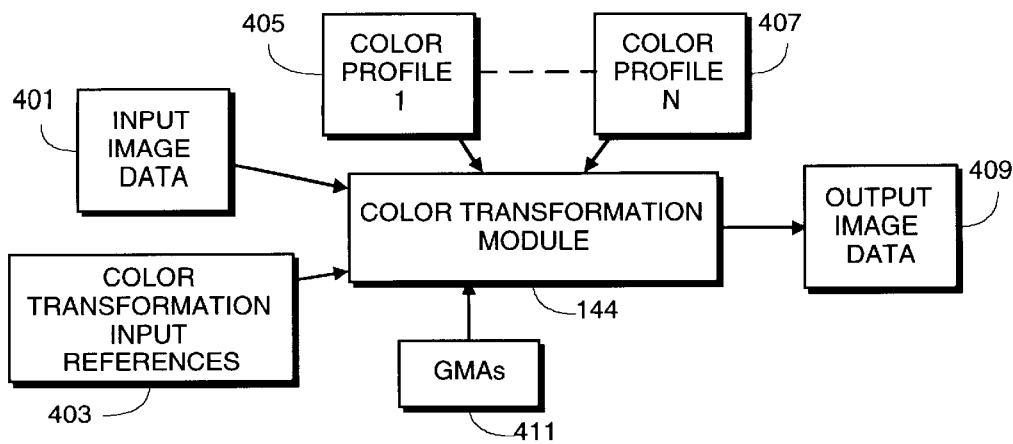
FIG. 4A is a view for providing a system level explanation of a color transform module according to the invention.

As discussed above, the present invention provides the capability to create an efficient transformation sequence for transforming color image data, such as the sequence depicted in FIG. 3, and for applying that sequence to a set of color image data. In one embodiment of the present invention, these capabilities are provided in a software module which resides in memory, such as color transform module 144 which is depicted in FIG. 2 as residing on fixed disk 45 of computer equipment 40. FIG. 4A provides a system level explanation of color transform module 144 according to one embodiment of the invention. Specifically, color transform module 144 is utilized to transform input image data 401 into output image data 409 by creating and applying an efficient color transformation sequence. Color transform module 144 creates the color transformation sequence based upon a set of color transformation input references which are provided by a user of color transform module 144. In general, color transformation input references 403 provide color transform module 144 with references to color profiles and/or gamut mapping algorithms which depict the color transformation scenario desired by the user. The content and arrangement of color transformation input references 403 and the creation of a color transformation sequence by color transform module 144 are discussed in more detail below.

Color profiles 405 and 407 depict a sequence of color profiles, 1 through N, which are required by color transform module 144 in order to create and apply a color transformation sequence. Specifically, color profiles 405 and 407 provide color transformation information corresponding to a particular device or to an abstract transformation. Such information is necessary for color transformations and gamut mapping of color image data. In addition, gamut mapping algorithms (GMAs) 411 are also provided to color transform module 144 in order to apply the appropriate gamut mapping algorithms as indicated in the color transformation sequence according to color transformation input references 403. Gamut mapping algorithms 411 may be provided from conventional color management module 145 or may be provided from other sources such as a stand-alone file on fixed disk 45. Thus, FIG. 4A provides an overall view of the components required for a color transform module to create and apply an efficient color transformation sequence, thereby resulting in output image data 409 which accurately provides a color image according to the color management scenario represented by color transformation input references 403.

Figure 4B:
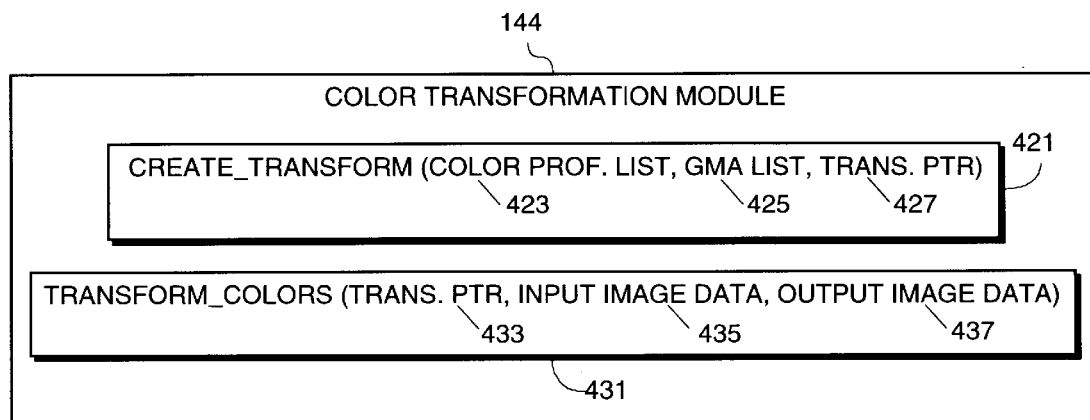
FIG. 4B is a view for providing an explanation of the structure of a color transform module according to the invention.

FIG. 4B provides an explanation of the components of color transform module 144. Specifically, in the preferred embodiment, color transform module 144 contains Create_Transform 421 and Transform_Colors 431. Create_Transform 421 is a software function, preferably comprised of computer-executable program steps, which creates a color transformation sequence from input references provided by a user. As can be seen from FIG. 4B, Create_Transform 421 has an application programming interface (API) which includes three components. Profile list 423 and GMA list 425 represent the color transformation input references provided by a user of Create_Transform 421. Specifically, profile list 423 is comprised of a list of color profiles which represent the color management scenario desired by the user. Similarly, GMA list 425 is comprised of a list of types of gamut mapping algorithms which the user wishes to apply in the desired color management scenario.

The composition and utilization of profile list 423 and GMA list 425 are discussed in more detail below. Transform pointer 427 is a pointer to a memory location where the color transformation sequence which is created by Create_Transform 421 can be located. Transform_Colors 431 also has three components to its API. Specifically, transform pointer 433 points to a location where a color transformation sequence that was created by Create_Transform 421 is located. A pointer, such as transform pointer 433, may be a reference to a location in memory, an index into a table, a defined constant value, or other suitable identifying technique for identifying an object, such as Create_Transform 421. Input image data 435 is comprised of the color image data which the user desires to be transformed by the color transformation sequence corresponding to transform pointer 433. Output image data 437 is the color image data after being transformed by the color transformation sequence represented by transform pointer 433. In this manner, the user utilizes Create_Transform 421 to create a color transformation sequence based upon profile list 423 and GMA list 425, and then applies the color transformation sequence to input image data 435 in order to create output image data 437 through the use of Transform_Colors 431. As discussed above, other embodiments of these functions may be provided, such as a graphic user interface which allows a user to visually select profile list 423 and GMA list 425 from a list of options on monitor screen 42 by using keyboard 46 and/or pointing device 47. In the preferred embodiment, the functions of the present invention are accessed through the APIs of Create_Transform 421 and Transform_Colors 431.

Figure 4C:
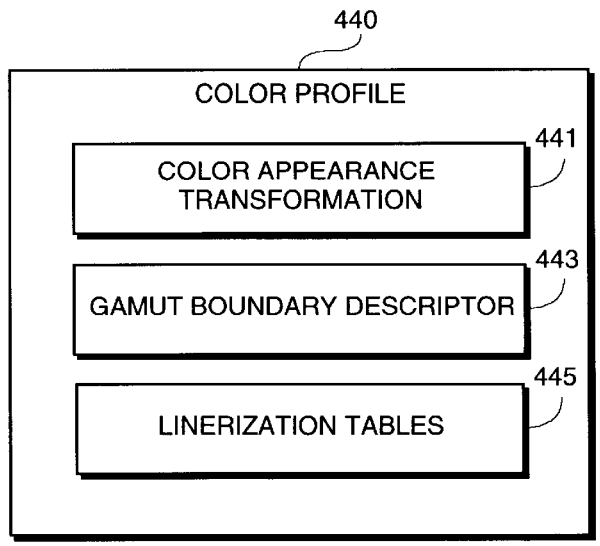
FIG. 4C is a view for providing an explanation of the structure of a color profile according to the invention.

FIG. 4C provides an explanation of the structure of a color profile which is accessed and utilized by color transform module 144 according to the invention. Specifically, color profile 440 is a file which contains information necessary for color management of color image data. A color profile is typically associated with a particular image device, such as a printer, scanner, monitor, or digital camera. However, a color profile may correspond to an abstract transformation for creatively altering or modifying color image data. For example, a user may create an abstract color profile for shifting the hue of all color image data values corresponding to a color image. Thus, color profiles that correspond to a particular device are often referred to as device color profiles, and color profiles that correspond to an abstract transformation are often referred to as abstract color profiles.

The format of color profile 440 is preferably a standardized format, such as the format defined by the International Color Consortium (ICC), thereby enabling the use of color profile 440 by multiple color management systems and multiple computing platforms. Specifically, color profile 440 contains color appearance transformation 441 which is utilized to transform color image data from a device color space corresponding to the device to which color profile 440 is associated into a device-independent color space so that the color image data may be efficiently transformed through a sequence of further color appearance transformations and gamut mappings. Color appearance transformation 441 may also be used to perform the reverse transformation for transforming color image data from device-independent color space to device-dependent color space. Next, gamut boundary descriptor 443 is provided to define the color gamut boundary associated with a color image device to which color profile 440 corresponds. As mentioned earlier, color profile 440 may not correspond to an actual color image device but may instead be an abstract color profile, in which color appearance transformation and gamut boundary descriptor 443 contain data that is not representative of any particular image device.

Gamut boundary descriptor 443 is utilized by a gamut mapping algorithm to map color image data such that the color image data is within the gamut boundary defined by gamut boundary descriptor 443, thereby enabling the color image data to be reasonably rendered on an image device associated with color profile 440. Linearization tables 445 contain one or more linearization tables of different types which are utilized during color appearance transformations and gamut mapping transformations in order to access color appearance transformation 441 and gamut boundary descriptor 443, respectively. As previously mentioned, color profile 440 is preferably an independent data file which is located in a memory area for convenient access by color transform module 144. For example, color profiles are provided on fixed disk 485 corresponding to digital camera 60, monitor 43, printer 50, scanner 70 and to other devices or abstract profiles.

Figure 5A:
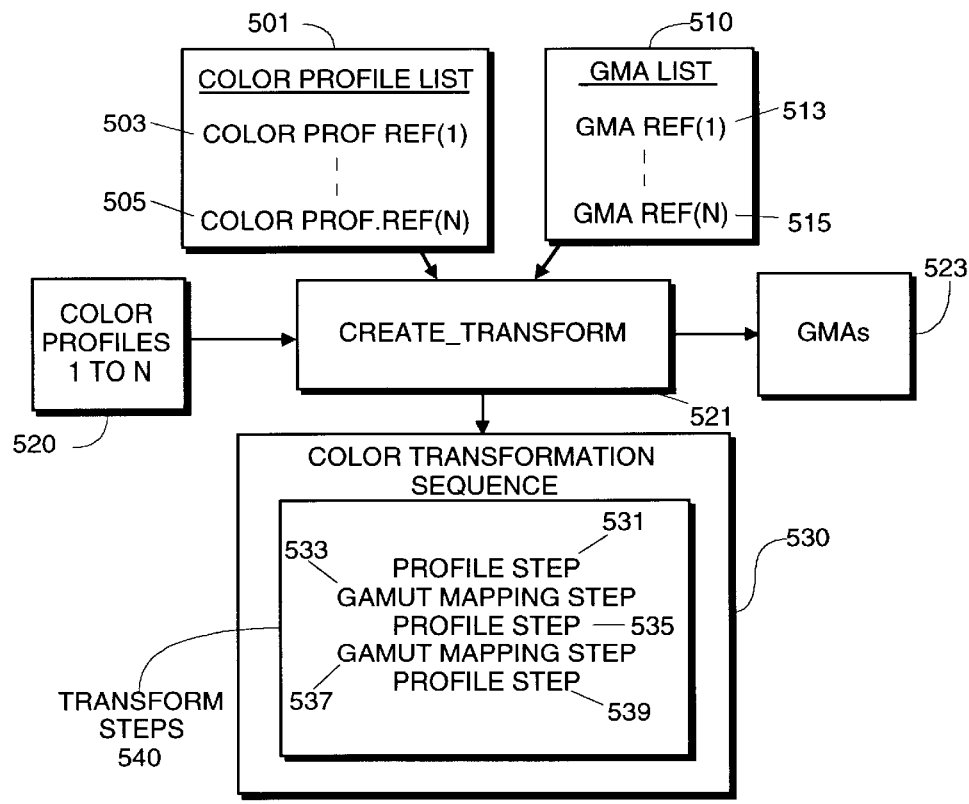
FIG. 5A is a view for providing a general explanation of the creation of a color transformation sequence according to one embodiment of the invention.

FIG. 5A is a view for explaining the creation of a transform at a system level according to the invention. Color profile list 501 and gamut mapping algorithm (GMA) list 510 are provided as input to Create_Transform 521. Specifically, color profile list 501 includes multiple reference entries for containing color profile references such as color profile reference(1) 503 through color profile reference (N) 505. Therefore, color profile list 501 allows a user to select one or more color profile references which represent the color transformation scenario that is desired by the user. Color profile reference(1) 503 through color profile reference(N) 505 correspond to individual color profiles, such as the one depicted in FIG. 4C, which may or may not be associated with either a particular image device or which may be an abstract profile as discussed above. GMA list 510 includes multiple reference entries for containing GMA references which are selected by the user, such as GMA reference(1) 513 and GMA reference(N−1) 515. As can be seen upon inspection of GMA list 510, it is preferable that there be one less GMA reference than the number of color profile references contained in color profile list 501. This is because gamut mapping is typically required when going between two different color spaces represented by two different color profiles, respectively.

Create_Transform 521 requires access to color profiles (1 to N) 520 and GMAs 523 for creation of color transformation sequence 530. As discussed above, pointers or other suitable access mechanisms can be utilized to access these objects. Specifically, Create_Transform 521 obtains color appearance transformations and linearization tables from color profiles 520 in accordance with color profile references 503 through 505. GMAs 523 correspond to each type of GMA referenced in GMA references 513 through 515. As discussed above, GMAs 523 may be provided by a conventional color management module such as color management module 145 on fixed disk 45 or may be contained in separate independent files. Based upon color profile list 501, GMA list 510, color profiles 520 and GMAs 523, Create_Transform 521 generates color transformation sequence 530. As can be seen in FIG. 5A, color transformation sequence 530 contains multiple transform steps for transforming color image data according to a color management scenario. The transform steps consist of profile steps and gamut mapping steps. As can be appreciated upon inspection of color profile list 501 and GMA list 510, color transformation sequence 530 may contain only one transform step or may contain numerous transform steps of various combination of profile and gamut mapping steps.

In the embodiment depicted in FIG. 5A, the first transform step is profile step 531. For example, profile step 531 corresponds to a color appearance transformation obtained from the color profile of an input device from which the color image data was obtained, thereby mapping the color image data from the color space of the input device to a device-independent color space. Next, gamut mapping step 533 corresponds to the first GMA reference in GMA list 510, in this case GMA reference 513. As will be discussed further below, Create_Transform 521 determines whether or not a transform step should be created for each of the color profile references of color profile list 501 and for each of the GMA references of GMA list 510. In this manner, Create_Transform 521 includes only those transforms necessary to achieve the desired result according to the color management scenario represented by color profile list 501 and GMA list 510, while avoiding unnecessary transformations of the color image data in color transformation sequence 530. In this regard, profile steps 535, which are located between the first and last transform steps, are only created if corresponding color profile references located between color profile references 503 and 505 correspond to abstract color profiles. In other words, no transform step other than the first and last transform steps is a profile step unless it corresponds to an abstract color profile.

Gamut mapping steps 537 correspond to the remainder of the GMA references in GMA list 510. Lastly, profile step 539 is created if the last color profile reference, in this case color profile reference(N) 505, corresponds to a device color profile. Thus, it can be appreciated that color transformation sequence 530 avoids unnecessary transformations into and out of device-dependent color spaces corresponding to device color profiles.

Figure 5B:
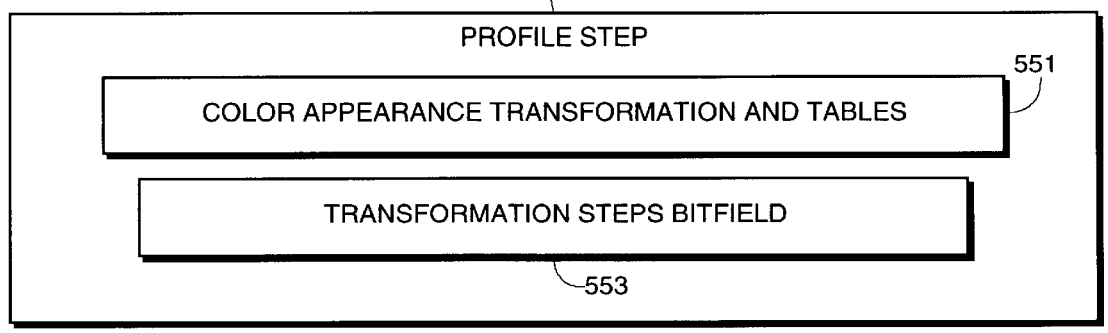
FIG. 5B is a view for providing an explanation of the structure of a profile step according to one embodiment of the invention.

FIG. 5B provides a view for explaining the structure of a profile step according to one embodiment of the invention. Specifically, when Create_Transform 521 reads a color profile reference from color profile list 501 and determines that a profile step should be generated corresponding to that color profile reference, Create_Transform 521 accesses the appropriate color profile from color profiles 520 and extracting the necessary data from the color profile to create the profile step. As can be seen in FIG. 5B, profile step 531 contains color appearance transformation and tables 551. In this manner, the appropriate color appearance transformation and corresponding tables are copied from the appropriate color profile so that profile step 531 has the necessary data to transform the color image data appropriately when profile step 531 is applied to the color image data. Color appearance transformation and tables 551 is comprised of data obtained from color appearance transformation 441 and linearization tables 445 as depicted in FIG. 4C.

Preferably, color appearance transformation and tables 551 contains a color space transformation, a first set of one-dimensional look-up tables, a 3×3 matrix, a second set of one-dimensional look-up tables, a multi-dimensional look-up table, a third set of one-dimensional look-up tables, and a second color space transformation. In this manner, profile step 531 contains the data necessary to map color image data into, and out of, device-independent color space. It should be noted that not every transformation or table listed above will be used by profile step 531.

For example, input image data from a monitor would use the first set of one-dimensional look-up tables followed by the 3×3 matrix and then the color space transformation to transform from CIE XYZ space into CIE JCh space. The other steps would not be used. On the other hand, output of color image data to a monitor would use the color space transformation to transform from JCh to XYZ color space, followed by the 3×3 matrix and then the second set of one-dimensional look-up tables.

Transformation steps bitfield 553 provides a mechanism for indicating which of the above-listed components are specifically required by profile step 531.

Figure 5C:
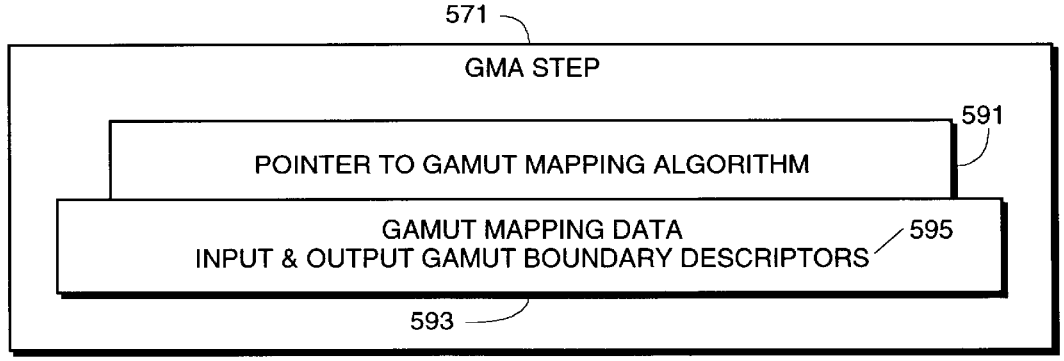
FIG. 5C is a view for providing an explanation of the structure of a gamut mapping step according to one embodiment of the invention.

FIG. 5C provides a view for explaining the structure of a gamut mapping step according to the invention. Specifically, and as mentioned earlier, the present invention allows the user to select which type of gamut mapping algorithm to use at various points in the color transformation sequence 530 generated by Create_Transform 521. As seen upon inspection of FIG. 5C, gamut mapping step 571 contains gamut mapping algorithm pointer 591 which points to the specific one of GMAs 523 that is requested by the user in the corresponding GMA reference in GMA list 510. For example, GMA pointer 591 may point to a particular type of gamut mapping algorithm contained within conventional color management module 145. Of course, other suitable means for identifying a particular type of gamut mapping algorithm may be used, such as identifying the gamut mapping algorithm by name. It can be appreciated that other gamut mapping steps may contain GMA pointers that point to other types of gamut mapping algorithms as indicated by the user in GMA references 513 through 515 contained in GMA list 510. In this manner, the user can control which type of gamut mapping algorithm is to be applied at a given point in color transformation sequence 530.

Gamut mapping step 571 also contains gamut mapping data 593 which contains a block of data necessary for the particular type of gamut mapping algorithm indicated by gamut mapping algorithm pointer 591 to perform gamut mapping. Preferably, gamut mapping data 593 contains both the input and output gamut boundary descriptors which are obtained from color profiles 520 and which correspond to the input and output devices between which gamut mapping step 571 is mapping color image data. For example, a particular gamut mapping algorithm has an initialization routine to set up whatever information is needed by that particular gamut mapping algorithm. Preferably, this initialization data is also provided in gamut mapping data 593. It can be appreciated that the presence of the input and output gamut boundary descriptors 595 increases the efficiency of gamut mapping step 571 when the particular gamut mapping algorithm is applied to the color image data.

Figure 6A:
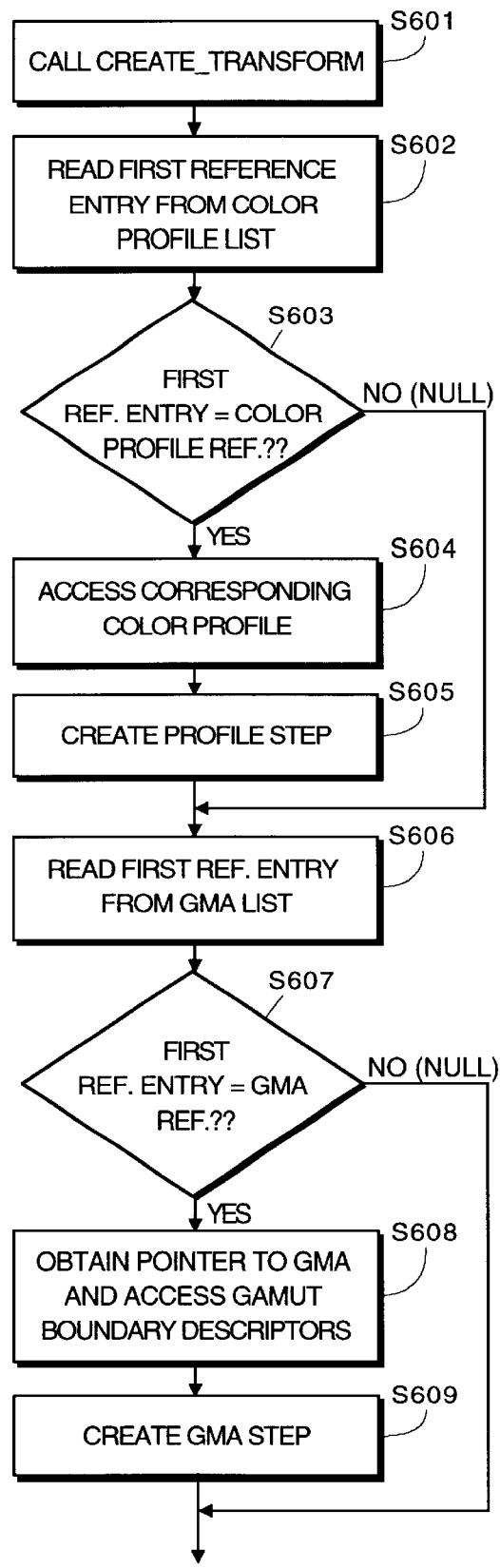
FIG. 6A is a flowchart for providing a detailed explanation of the creation of a color transformation sequence according to one embodiment of the invention.

FIG. 6A is a flowchart for explaining the creation of a color transformation sequence according to the invention. In step S601, the Create_Transform function is called from color transform module 144. As discussed above, a color profile list and a gamut mapping algorithm (GMA) list are provided as input to the Create_Transform application programming interface (API). Specifically, the user of Create_Transform has previously prepared a color profile list and a GMA list which indicate the color profiles and types of gamut mapping algorithms that are representative of the color management scenario for which the user wishes to create a color transformation sequence. Next, in step S602, the first reference entry of the color profile list is read for appropriate processing as follows. In step S603, it is determined whether the first reference entry of the color profile list contains a color profile reference. If the first reference entry of the color profile list does contain a color profile reference, whether abstract or device, flow passes to step S604 in which the appropriate corresponding color profile is accessed.

As discussed earlier, the corresponding color profile is accessed so as to obtain the color appearance transformation and linearization table information. Next, a profile step is created corresponding to the first reference entry by utilizing the information obtained from the corresponding color profile (step S605). If, in the alternative, it is determined in step S603 that the first reference entry does not contain a color profile reference but instead contains a null value, then flow passes directly to step S606. The use of a null value in the first reference entry of the color profile list will be explained further below.

In step S606, the first reference entry is read from the gamut mapping algorithm list. It is determined in step S607 whether the first reference entry in the GMA list contains a GMA reference. If the first reference entry does contain a GMA reference, the appropriate gamut mapping algorithm (GMA) is located and a pointer to that location is created (step S608). As discussed above, the corresponding GMA is preferably provided from a conventional color management module, or in the alternative may be provided in color transform module 144. In addition to creating a pointer to the appropriate GMA, the gamut boundary descriptors corresponding to the input and output devices are accessed. Next, in step S609, a GMA step is created which includes the pointer to the appropriate GMA and also includes copies of the gamut boundary descriptors corresponding to the relevant input and output color spaces. If, in step S607, it is determined that the first reference entry in the GMA list does not contain a GMA reference, then flow is passed directly to step S610, which is provided at the top of FIG. 6B.

Figure 6B:
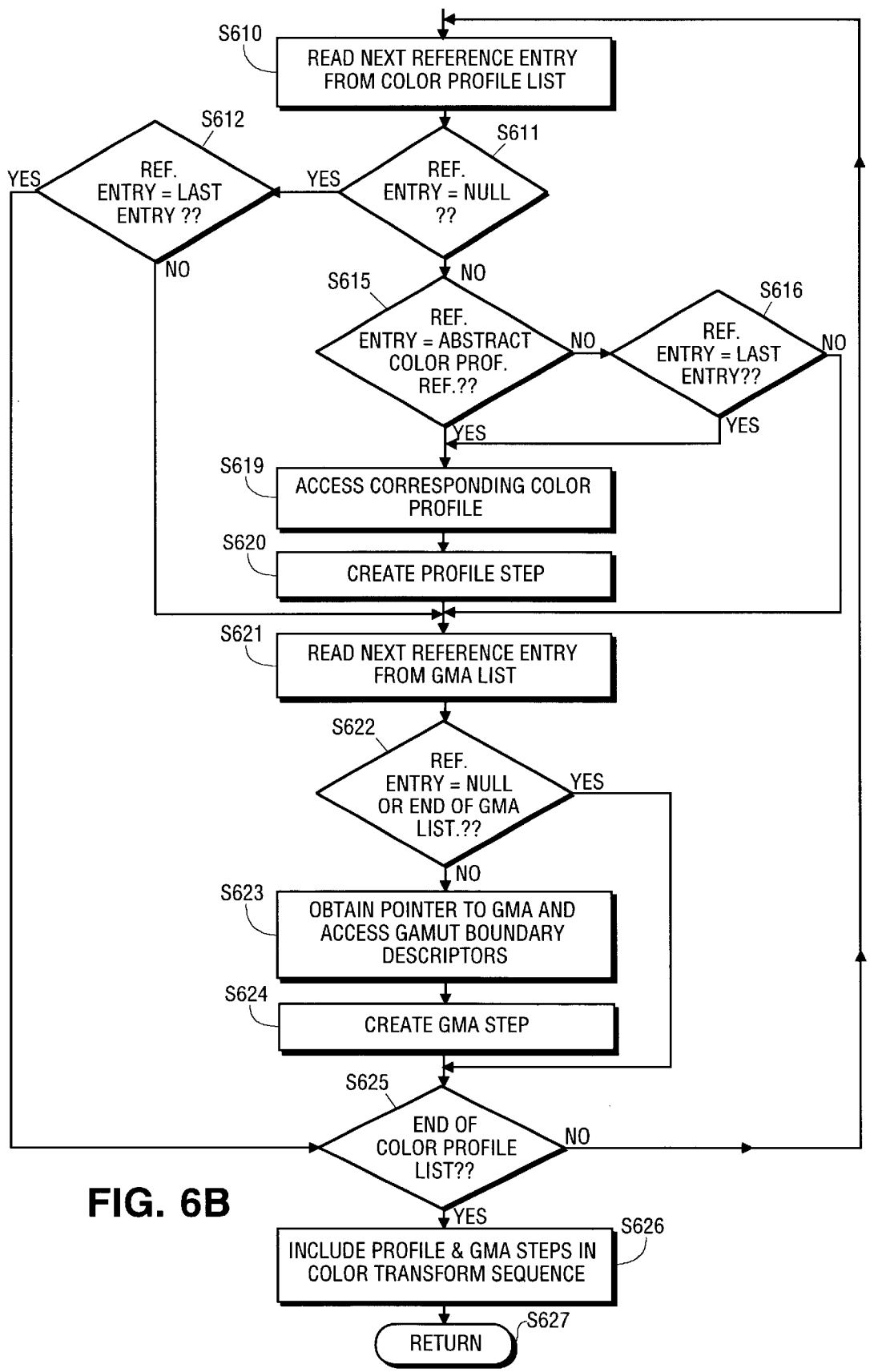
FIG. 6B is a continuation of the flowchart of FIG. 6A for providing a detailed explanation of the creation of a color transformation sequence according to one embodiment of the invention.

Turning to FIG. 6B, the next reference entry is read from the color profile list in step S610. It is then determined if the next reference entry from the color profile list contains a null value (step S611). If the next reference entry from the color profile list does contain a null value, flow is passed to step S612 in which is determined whether the reference entry is the last reference entry in the color profile list. If the reference entry is the last entry in the color profile list, flow is passed to step S625. If, however, the reference entry of the color profile list is not the last entry, then flow passes directly to step S621. In this manner, it can be seen that a null value in the last reference entry of the color profile list is used to indicate that a color transformation sequence is to be created which contains only one transform step, wherein the transform step is comprised of a profile step corresponding to the first reference entry of the color profile list.

Returning to step S611, if the reference entry of the color profile list does not contain a null value and instead contains a color profile reference, flow passes to step S615 in which it is determined whether the reference entry of the color profile list contains an abstract color profile reference. If the reference entry does contain an abstract color profile reference, the color profile corresponding to the abstract color profile reference is accessed in step S619, and a corresponding profile step is created in step S620. If, however, it is determined in step S615 that the reference entry contains a device color profile, flow passes to step S616 in which it is determined whether the reference entry is the last reference entry in the color profile list. If this is the case, then flow passes directly to steps S619 and S620 to create a profile step as described above. If, however, it is determined in step S616 that the reference entry is not the last reference entry, then flow passes to step S621. Thus, it can be seen that profile steps are only created for a device color profile referenced in the first reference entry of the color profile list, for abstract profiles referenced in subsequent reference entries of the color profile list, and for the last reference entry of the color profile list if it refers to a device color profile. In this manner, unnecessary profile steps are avoided and, in addition, a color transformation sequence can be created which contains only one profile step.

In step S621, the next reference entry from the GMA list is read. It is determined in step S622 whether the reference entry from the GMA list is either equal to a null value or is already at the end of the GMA list. If either case is true, flow passes directly to step S625. Otherwise, flow passes to step S623 in which a pointer is created to the appropriate GMA and in which the appropriate gamut boundary descriptors are accessed as described above. A GMA step is then created in step S624. In step S625, it is determined whether the end of the color profile list has already been reached, and if so, flow passes to step S626 in which all of the created profile steps and GMA steps are included in the color transformation sequence in the order in which they were created. Flow then passes to return in step S627. If, however, it is determined in step S625 that the end of the color profile list has not already been reached, then flow passes back to the top of step S610, and the aforementioned process steps between step S610 and step S625 are repeated until the end of the color profile list is reached. In this manner, an efficient and appropriate color transformation sequence is created whereby only those profile steps that are necessary are included in the color transformation sequence. Specifically, unnecessary profile steps corresponding to device color profile references are avoided, thereby reducing the artifacts and errors that are introduced with every mapping in and out of device-independent color space.

Figure 7:
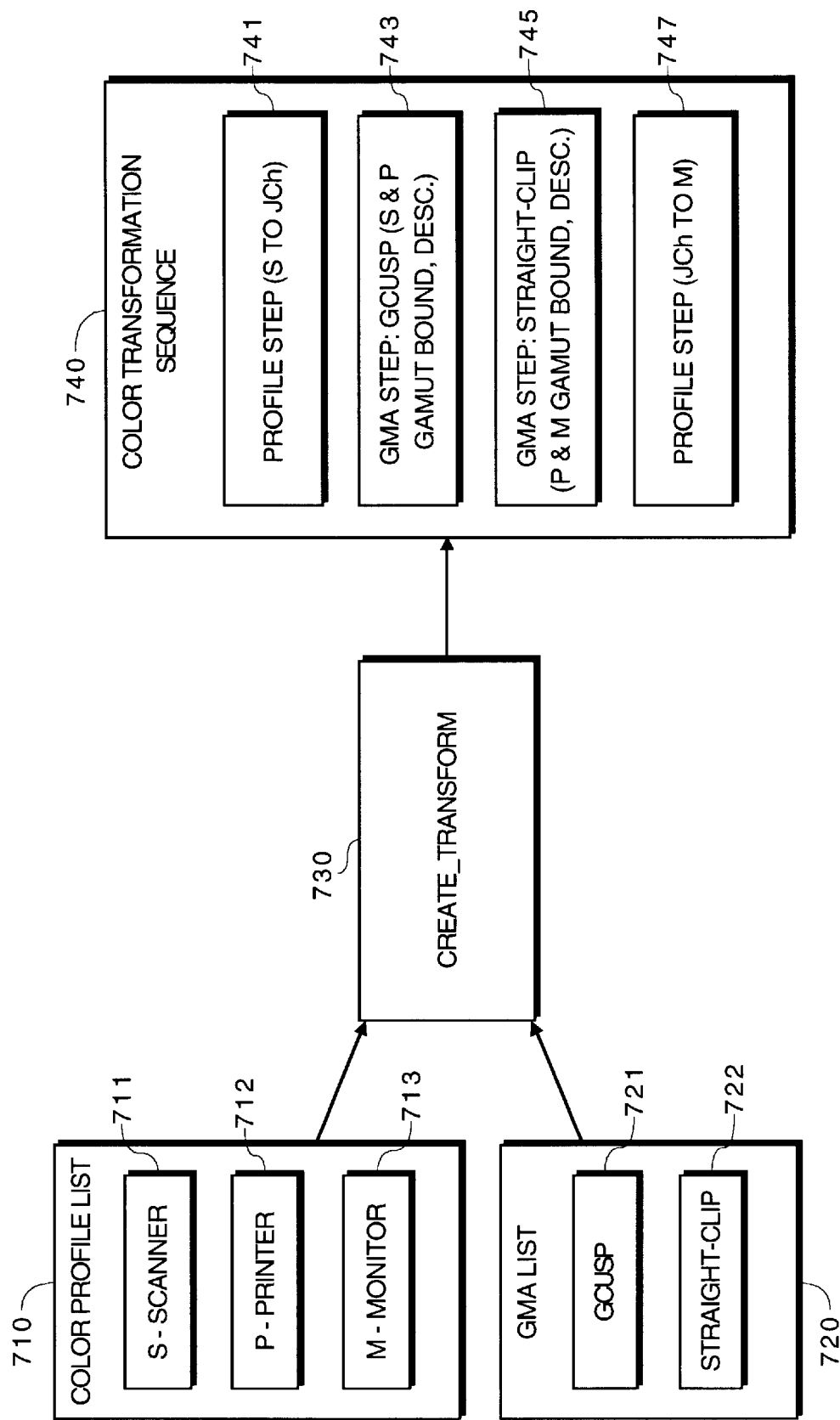
FIG. 7 is a view for providing an explanation of an example of a created color transformation sequence according to the invention.

FIG. 7 provides an example of a color transformation sequence created according to the present invention for creating a proof image from an image input from scanner 70 as it would appear on printer 50, wherein the proof image is viewed on monitor 43. Profile list 710 and GMA list 720 are provided by a user as input data to Create_Transform 730. Profile list 710 has three reference entries corresponding to a scanner color profile reference 711, a printer color profile reference 712, and a monitor color profile reference 713. GMA list 720 has two reference entries corresponding to a GCUSP gamut mapping reference and a straight-clip gamut mapping reference.

Create_Transform 730 then generates color transformation sequence 740 based on the reference entries in profile list 710 and GMA list 720 according to the logic depicted in the flowcharts of FIGS. 6A and 6B. As can be seen upon inspection of FIG. 7, color transformation sequence 740 contains four transform steps. Profile step 741 is provided to transform color image data from the scanner color space, such as RGB, to device-independent color space, such as JCh. This profile step was created in accordance with scanner color profile reference 711 of profile list 710. GMA step 743 is provided to gamut map the color image data from within the gamut boundary of the scanner to within the gamut boundary of the printer by using a GCUSP gamut mapping algorithm. This gamut mapping step was created in accordance with GCUSP GMA reference 721 of GMA list 720.

Similarly, GMA step 745 is provided to gamut map the color image data from within the gamut boundary of the printer to within the gamut boundary of the monitor by using a straight-clip gamut mapping algorithm. This gamut mapping step was created in accordance with straight-clip GMA reference 722 of GMA list 720. Lastly, profile step 747 is provided to transform color image data from the device-independent color space, such as JCh, to the color space of the monitor, such as RGB. This profile step was created in accordance with monitor color profile reference 713 of profile list 710. It is important to note that the present invention creates an efficient color transformation sequence that avoids the inclusion of unnecessary transformations into, and out of, device-independent color space. In this example, it can be seen that profile steps were not created to transform the color image data into, and out of, the color space of the printer corresponding to printer color profile reference 712. The inclusion of such transformations in the sequence would not only be superfluous and inefficient, but would also introduce errors that occur when transforming into, and out of, device-independent color space.

Figure 8:
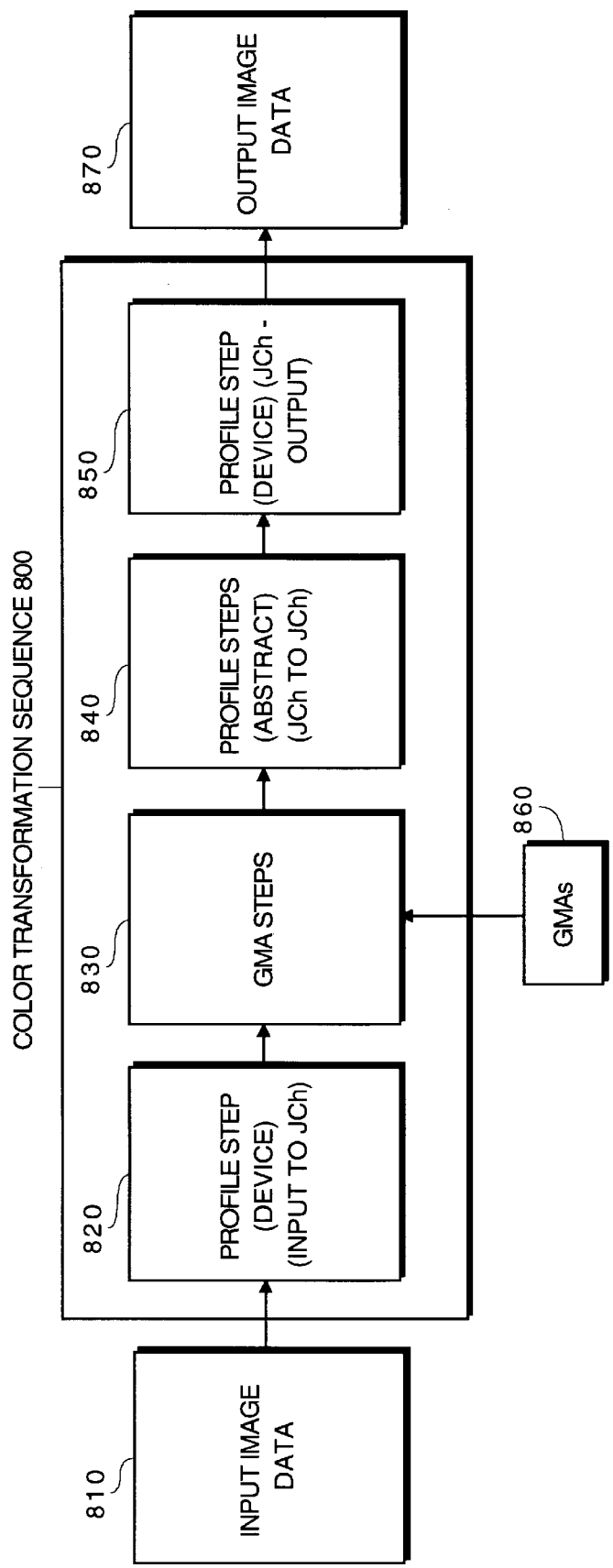
FIG. 8 is a view for providing a general explanation of the transformation of color image data according to the invention.

FIG. 8 provides a system level explanation of the transformation of color image data through the use of a color transformation sequence according to the invention. In FIG. 8, input image data 810 is provided for transformation by color transformation sequence 800. The first transform step of color transformation sequence 800 in this embodiment is profile step 820 which transforms input image data 810 from the device-dependent color space corresponding to the input device, such as RGB, into device-independent color space, such as JCh. Next, GMA steps 830 are applied to input image data 810 in order to gamut map input image data 810 into the indicated gamut boundaries. GMA steps 830 utilize corresponding GMAs 860 which are provided from an external source, such as conventional color management module 145 or from color transform module 144. In addition, GMAs 860 utilize gamut boundary descriptors of the input and output color spaces in order to accurately perform gamut mapping.

Profile steps 840 are provided to transform input image data 810 through abstract color transformations which correspond to abstract color profiles. Such abstract profiles are used for creative color modifications and corrections. Lastly, profile step 850 transforms input image data 810 from the device-independent color space, such as JCh, into device-dependent color space corresponding to the output device such as RGB, thereby producing output image data 870. It should be noted that there are no profile steps in color transformation sequence 800 corresponding to device color profiles other than the first and last transform steps. In this manner, unnecessary transformations into, and out of, device-independent color space (JCh) are avoided, thereby increasing processing efficiency and reducing unwanted artifacts and errors introduced by such transformations. It can also be appreciated that color transformation sequence 800 includes the use of gamut mapping algorithms that are flexible enough to be used for gamut mapping between any two gamut boundaries provided that the respective gamut boundary descriptors are provided at the time the gamut mapping algorithm is applied. Thus, color transformation sequence 800 is not dependent on a large number of predetermined gamut mapping transforms, each of which only applies to a particular combination of input and output devices under particular conditions. Nor does color transformation sequence 800 depend on mapping all color profiles through a fixed common gamut boundary, such as the ICC Profile Connection Space.

Figure 9:
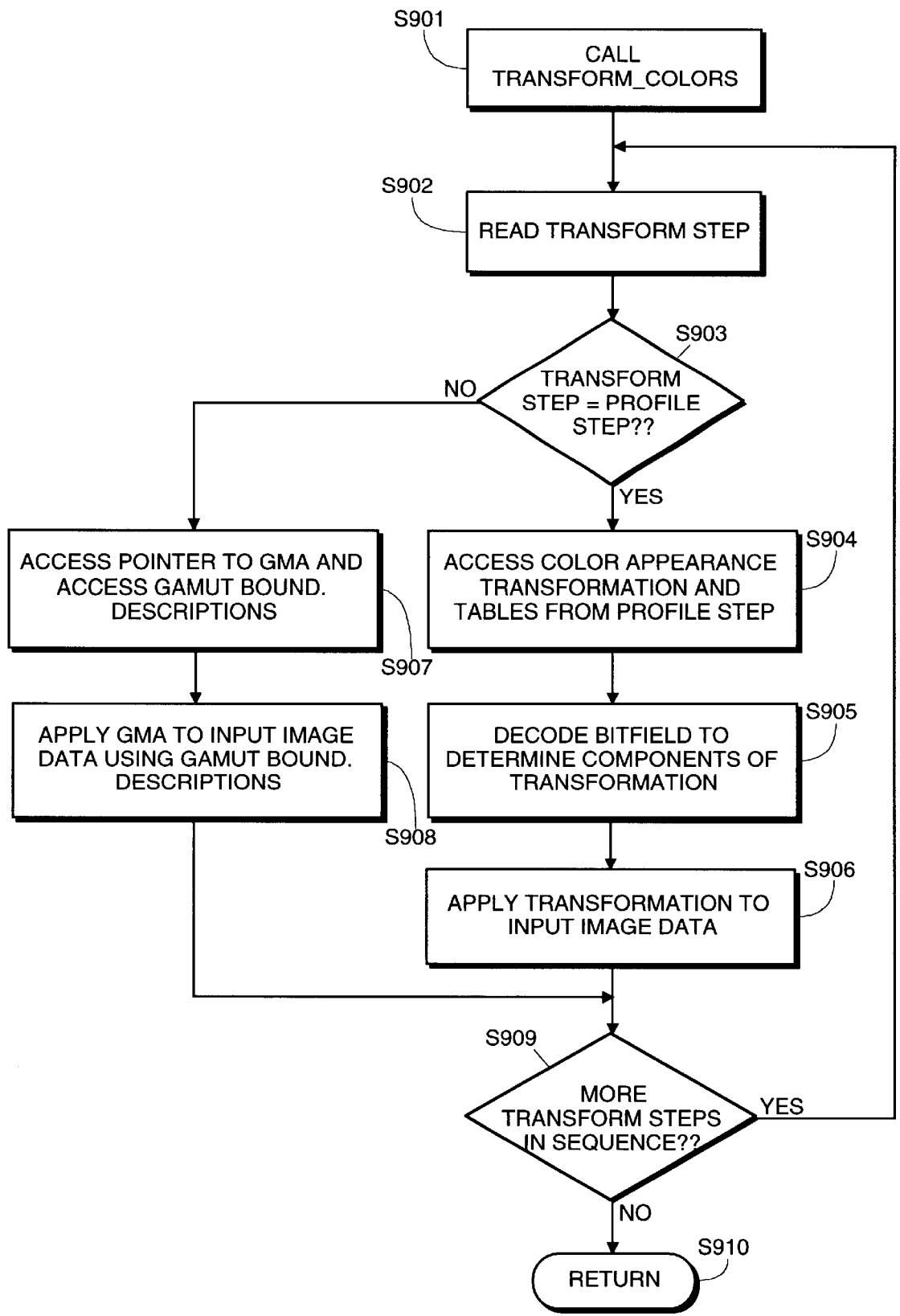
FIG. 9 is a flowchart for providing a detailed explanation of the transformation of color image data according to the invention.

A flowchart for explaining the transformation of color image data according to one embodiment of the invention is provided in FIG. 9. In step S901, the Transform_Colors application programming interface (API) is called. The transform pointer to the color transformation sequence that the user wishes to apply is provided, along with input image data. Next, the first transform step in the color transformation sequence is read (step S902). It is determined in step S903 whether the transform step is a profile step. If the first transform step is a profile step, flow passed to step S904 in which the color appearance transformation and tables are accessed from the profile step. The transformation steps bitfield is then accessed from the profile step and decoded to determine which transform and/or tables, such as one-dimensional tables from the color appearance transformation and tables are to be utilized in this particular profile step.

The appropriate transformation is then applied to the input image data according to this determination in step S906.

If, in the alternative, it is determined in step S903 that the transform step is a GMA step, then flow passes to step S907 in which the GMA pointer and the input and output gamut boundary descriptors are accessed from the GMA step. As explained earlier, the GMA pointer is utilized to access the appropriate GMA for application to the input image data. Preferably, the appropriate GMA is accessed from an external source such as conventional color management profile 145, although it can be accessed from other sources. The appropriate GMA is then applied to the input image data in step S908. Flow then passes to step S909. In step S909, it is determined whether there are any more transform steps left in the color transformation sequence to process. If there are no more transform steps, flow is directed to return S910. If there are more transform steps to process, flow is directed to the top of step S902 to repeat steps S902 through S909 until there no more transform steps to process.

Figure 10:
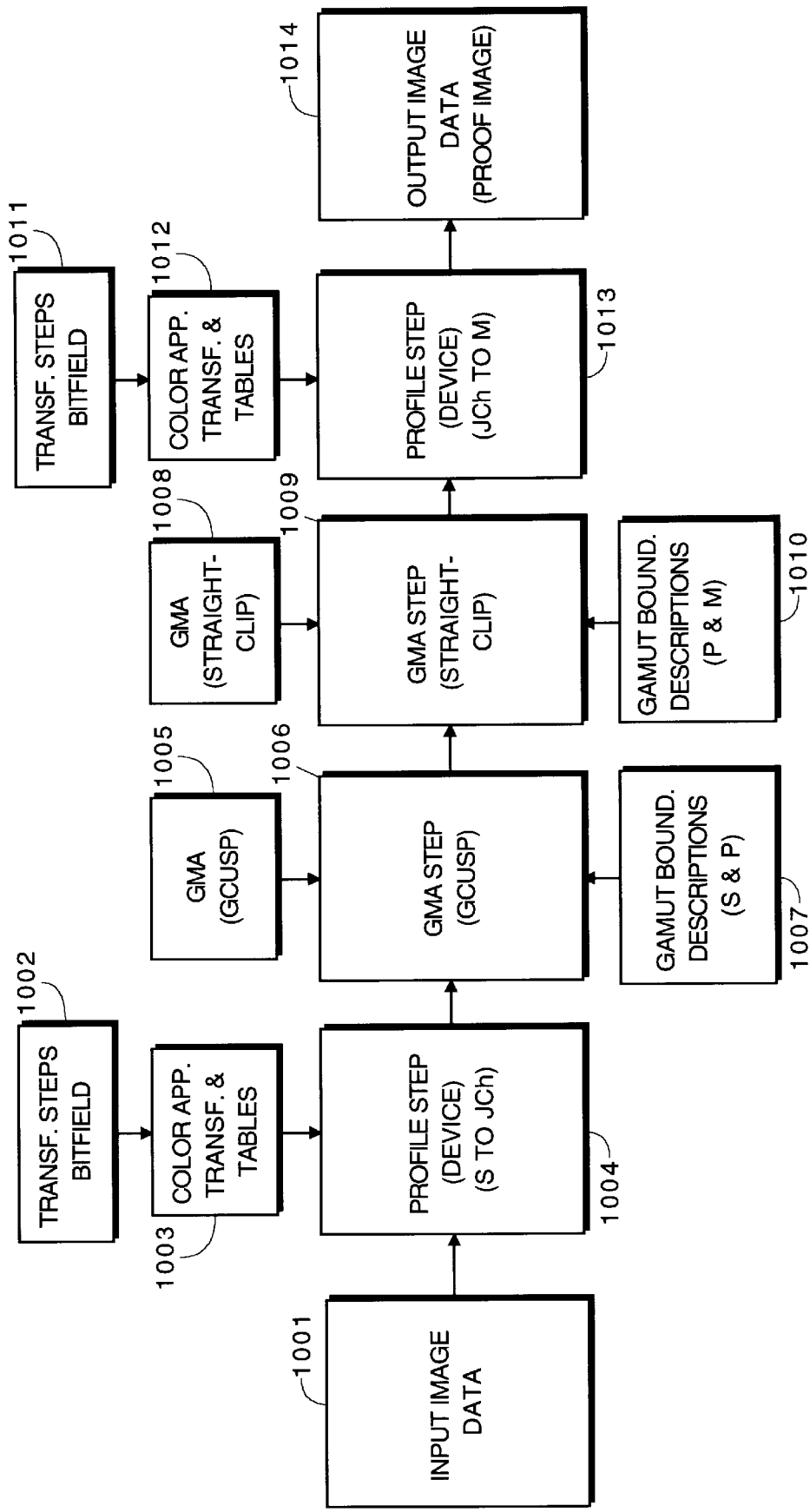
FIG. 10 is a view for providing an explanation of an example of the transformation of color image data according to the invention.

FIG. 10 provides and example of the transformation of color image data according to the invention. Input image data 1000 is provided for being transformed into a desired color space according to color transformation sequence 740 depicted in FIG. 7 for proofing of an image from scanner 70 as it would appear on printer 50, wherein the proof image is viewed on monitor 43. The first transform step is profile step 1004 for transforming input image data 1001 from the device-dependent color space of scanner 70 to device-independent JCh color space. Profile step 1004 utilizes transformation steps bitfield 1002 and color appearance transformation and tables 1003 in order to perform the transformation.

GMA step 1006 is then applied to input image data 1001 in order to gamut map input image data 810 from within the color gamut boundary of scanner 70 to within the color gamut boundary of printer 50. GMA step 1006 utilizes GCUSP GMA 1005 and scanner and printer gamut boundary descriptors 1007 in order to perform the gamut mapping. Similarly, GMA step 1009 is applied to input image data 1001 in order to gamut map input image data 810 from within the color gamut boundary of printer 50 to within the color gamut boundary of monitor 43. GMA step 1009 utilizes straight-clip GMA 1008 and printer and monitor gamut boundary descriptors 1010 in order to perform the gamut mapping. Profile step 1013 for transforming input image data 1001 from the device-independent JCh color space to the device-dependent color space of monitor 43. Profile step 1013 utilizes transformation steps bitfield 1011 and color appearance transformation and tables 1012 in order to perform the transformation. In this manner, output image data 1014 corresponding to the proof image is created in an efficient and accurate manner.

Thus, the invention provides the capability to create an efficient color transformation sequence of transform steps for transforming color image data through one or more color spaces. The sequence of transform steps is generated based upon user preselected color profiles and/or gamut mapping algorithms. In this manner, complex and accurate transform sequences for performing color management of color image data, such as proofing, creative color modeling, and gamut boundary determinations, can be quickly created, applied and evaluated by a developer. In addition, the user can control the selection of the gamut mapping algorithms to be used throughout the color transformation sequence, which can include flexible gamut mapping algorithms that utilize color gamut descriptors of the input and output color spaces at the time gamut mapping is performed.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for generating a color transformation sequence comprised of transform steps, said color transformation sequence for transforming color image data, said method comprising the steps of:

receiving a color profile list which includes at least one user-supplied reference to a color profile and receiving a gamut mapping algorithm list which includes at least one user-supplied reference to a gamut mapping algorithm, the color profile containing a color transform and the gamut mapping algorithm being accessed from the color profile or from an external source separate from the color profile;

generating transform steps based on the received user-supplied references, wherein the transform steps include a profile step based on the color transform and a gamut mapping step based on the gamut mapping algorithm; and including the generated transform steps in the color transformation sequence.

2. A method according to claim 1, wherein the received references are provided by a user.

3. A method according to claim 2, wherein the received references include a color profile list and a gamut mapping algorithm list, wherein the color profile list has at least one reference entry for containing a color profile reference, and wherein the gamut-mapping algorithm list has at least one reference entry for containing a gamut mapping algorithm reference.

4. A method according to claim 3, wherein the step for generating the transform steps includes:

creating a transform step comprised of a profile step in the case that a first reference entry of the color profile list contains a color profile reference;

creating a transform step comprised of a gamut mapping step for each reference entry of the gamut mapping algorithm list that contains a gamut mapping algorithm reference;

creating a transform step comprised of a profile step for each color profile reference that corresponds to an abstract color profile and that is present in interim reference entries between the first and last entries of the color profile list; and creating a transform step comprised of a profile step in the case that the last reference entry of the color profile list contains a color profile reference that corresponds to a device color profile.

5. A method according to claim 3, wherein the step for generating the transform steps includes:

creating one transform step comprised of a profile step in the case that a first reference entry of the color profile list contains a null value and a second reference entry of the color profile list contains a color profile reference, wherein the profile step transforms the color image data from a device-independent color space to a device-dependent color space.

6. A method according to claim 3, wherein the step for generating the transform steps includes:

creating one transform step comprised of a profile step in the case that a first reference entry of the color profile list contains a color profile reference and a second reference entry of the color profile list contains a null value, wherein the profile step transforms the color image data from a device-dependent color space to a device-independent color space.

7. A method according to claim 1, wherein the profile step includes a color appearance transformation and a bitfield, wherein the bitfield indicates how the color appearance transformation is applied to the color image data.

8. A method according to claim 1, wherein the gamut mapping step includes a pointer to a gamut mapping algorithm and includes a data block containing at least one gamut boundary descriptor for use by the gamut mapping algorithm to gamut map the color image data.

9. A method according to claim 1, wherein the received references contain a reference to a gamut mapping algorithm that utilizes an input gamut boundary description and an output gamut boundary description when the gamut mapping algorithm is applied to color image data.

10. A method for generating a color transformation sequence comprised of transform steps, said color transformation sequence for transforming color image data, said method comprising the steps of:

receiving a color profile list and a gamut mapping algorithm list, wherein the color profile list has at least one reference entry for containing a user-supplied color profile reference, and wherein the gamut-mapping algorithm list has at least one reference entry for containing a user-supplied gamut mapping algorithm reference, the color profile reference corresponding to a color profile containing a color transform, and the gamut mapping algorithm reference corresponding to a gamut mapping algorithm which is accessed from a color profile or from an external source separate from the color profile;

creating a transform step comprised of a profile step in the case that a first reference entry of the color profile list contains a color profile reference;

creating a transform step comprised of a gamut mapping step for each reference entry of the gamut mapping algorithm list that contains a gamut mapping algorithm reference;

creating a transform step comprised of a profile step for each color profile reference that corresponds to an abstract color profile and that is present in interim reference entries between the first and last entries of the color profile list;

creating a transform step comprised of a profile step in the case that the last reference entry of the color profile list contains a color profile reference that corresponds to a device color profile; and including the created transform steps in the color transformation sequence.

11. A method for transforming color image data by applying a color transformation sequence comprised of transform steps to the color image data, said method comprising the steps of:

accessing the color transformation sequence;

accessing the color image data; and sequentially processing each transform step of the color transformation sequence to transform the color image data, wherein, in the case that the transform step being processed is a profile step, a color transformation module is accessed from a corresponding user-supplied color profile and is applied to the color image data, and wherein, in the case that the transform step being processed is a gamut mapping step, a corresponding gamut mapping algorithm is accessed from a user-supplied color profile or from an external source separate from the color profile and is applied to the color image data.

12. A method according to claim 11, wherein the color transformation sequence and the color image data are provided by a user.

13. A method according to claim 11, wherein the corresponding gamut mapping algorithm is accessed from a color management module for application to the color image data.

14. A method according to claim 11, wherein the corresponding gamut mapping algorithm utilizes an input gamut boundary description and an output gamut boundary description for gamut mapping the color image data.

15. A method according to claim 13, wherein the corresponding gamut mapping algorithm utilizes an input gamut boundary description and an output gamut boundary description for gamut mapping the color image data.

16. A method for transforming color image data by applying a color transformation sequence comprised of transform steps to the color image data, said method comprising the steps of:

accessing the color transformation sequence;

accessing the color image data; and sequentially processing each transform step of the color transformation sequence to transform the color image data, wherein, in the case that the transform step being processed is a profile step, a color transformation module is accessed from a corresponding user-supplied color profile and is applied to the color image data, and wherein, in the case that the transform step being processed is a gamut mapping step, a corresponding gamut mapping algorithm is accessed from a color management module in a user-supplied color profile or in an external source separate from the color profile, and an input gamut boundary description and an output gamut boundary description are accessed and utilized by the gamut mapping algorithm for gamut mapping the color image data.

17. Computer-executable process steps stored on a computer readable medium, said computer-executable process steps for generating a color transformation sequence comprised of transform steps, said color transformation sequence for transforming color image data, said computer-executable process steps comprising process steps according to any of claims 1 to 10.

18. A computer-readable medium which stores computer-executable process steps, the computer-executable process steps to generate a color transformation sequence comprised of transform steps, said color transformation sequence for transforming color image data, said computer-executable process steps comprising process steps according to any of claims 1 to 10.

19. A computing device for generating a color transformation sequence comprised of transform steps, said color transformation sequence for transforming color image data, said computing device comprising:

a program memory for storing process steps executable to generate a color transformation sequence comprised of transform steps according to any of claims 1 to 10; and a processor for executing the process steps stored in said program memory.

20. Computer-executable process steps stored on a computer readable medium, said computer-executable process steps for transforming color image data by applying a color transformation sequence comprised of transform steps to the color image data, said computer-executable process steps comprising process steps according to any of claims 11 to 16.

21. A computer-readable medium which stores computer-executable process steps, the computer-executable process steps to transform color image data by applying a color transformation sequence comprised of transform steps to the color image data, said computer-executable process steps comprising process steps according to any of claims 11 to 16.

22. A computing device for transforming color image data by applying a color transformation sequence comprised of transform steps to the color image data, said computing device comprising:
   a program memory for storing process steps executable to transform color image data by applying a color transformation sequence comprised of transform steps to the color image data, according to any of claims 11 to 16; and
   a processor for executing the process steps stored in said program memory.

23. A method according to claim 1, wherein the color profile list and the gamut mapping algorithm list are combined in a user-supplied transform list which includes a plurality of reference entries, the user-supplied transform list including at least one reference entry containing a color profile reference and including at least one reference entry containing a gamut mapping algorithm reference, and wherein the step for generating the transform steps includes:
   creating a transform step comprised of a profile step in the case that a first reference entry of the transform list contains a color profile reference;
   creating a transform step comprised of a gamut mapping step for each reference entry of the transform list that contains a gamut mapping algorithm reference;
   creating a transform step comprised of a profile step for each color profile reference that corresponds to an abstract color profile and that is present in an interim reference entry between the first reference entry and a last reference entry of the transform list; and
   creating a transform step comprised of a profile step in the case that the last reference entry of the transform list contains a color profile reference that corresponds to a device color profile.

* * * * *

UNITED STATES PATENT AND TRADEMARK OFFICE
CERTIFICATE OF CORRECTION

PATENT NO. : 6,603,483 B1
DATED : August 5, 2003
INVENTOR(S) : Newman

It is certified that error appears in the above-identified patent and that said Letters Patent is hereby corrected as shown below:

Column 8,
Line 28, "set or" should read -- set of --.

Column 11,
Line 20, "such.as" should read -- such as --; and
Line 62, "tion" should read -- tions --.

Column 12,
Line 34, "extract-" should read -- extracts --;
Line 35, "ing" should be deleted;
Line 43, "is comprised of" should read -- comprise --; and
Line 46, "contains" should read -- contain --.

Column 14,
Line 27, "which" should read -- which it --.

Column 16,
Line 61, "passed" should read -- passes --

Column 17,
Line 18, "no" should read -- are no --;
Line 19, "and" should read -- an --; and
Line 44, "step 1013" should read -- step 1013 is --.

Signed and Sealed this

Tenth Day of August, 2004

JON W. DUDAS
*Acting Director of the United States Patent and Trademark Office*